(12) United States Patent
Cheriton

(10) Patent No.: US 10,558,377 B2
(45) Date of Patent: *Feb. 11, 2020

(54) DEDUPLICATION-BASED DATA SECURITY

(71) Applicant: Intel Corporation, Santa Clara, CA (US)

(72) Inventor: David R. Cheriton, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 151 days.

This patent is subject to a terminal disclaimer.

(21) Appl. No.: 15/785,282

(22) Filed: Oct. 16, 2017

(65) Prior Publication Data

US 2018/0101322 A1  Apr. 12, 2018

Related U.S. Application Data

(63) Continuation of application No. 14/596,113, filed on Jan. 13, 2015, now Pat. No. 9,792,063.

(Continued)

(51) Int. Cl.
*G06F 3/06* (2006.01)
*G06F 21/62* (2013.01)
(Continued)

(52) U.S. Cl.
CPC ............ *G06F 3/0623* (2013.01); *G06F 3/064* (2013.01); *G06F 3/0673* (2013.01);
(Continued)

(58) Field of Classification Search
CPC ...... G06F 3/0623; G06F 3/064; G06F 3/0673; G06F 12/0866; G06F 21/6218;
(Continued)

(56) References Cited

U.S. PATENT DOCUMENTS 7,373,464 B2   5/2008 Zhu
8,199,911 B1 *  6/2012 Tsaur .................. G06F 16/1748
380/44

(Continued)

FOREIGN PATENT DOCUMENTS

CN   102591946 A   7/2012
WO      0186396   11/2001

OTHER PUBLICATIONS

Office Action dated Nov. 20, 2018 for European Application No. 15702877.0, 7 pages.

(Continued)

*Primary Examiner* — Kambiz Zand
*Assistant Examiner* — Shu Chun Gao
(74) *Attorney, Agent, or Firm* — Schwabe, Williamson & Wyatt, P.C.

(57) ABSTRACT

Providing data security includes: in response to a request to write data content to a storage, generating encrypted data content based on the data content; attempting to obtain a reference to the encrypted data content in the storage; in the event that the reference to the encrypted data content is obtained, modifying a translation line to refer to the reference to the encrypted data content in the storage; and in the event that the reference to the encrypted data content is not obtained: storing the encrypted data content at a new location; obtaining a reference to the encrypted data content stored at the new location; and modifying the translation line to refer to the reference to the encrypted data content stored at the new location.

20 Claims, 7 Drawing Sheets

Related U.S. Application Data

(60) Provisional application No. 61/927,914, filed on Jan. 15, 2014.

(51) Int. Cl.
  *G06F 21/78* (2013.01)
  *G06F 21/64* (2013.01)
  *H04L 9/06* (2006.01)
  *G06F 12/0866* (2016.01)

(52) U.S. Cl.
  CPC ...... *G06F 12/0866* (2013.01); *G06F 21/6218* (2013.01); *G06F 21/64* (2013.01); *G06F 21/78* (2013.01); *H04L 9/0631* (2013.01); *H04L 9/0643* (2013.01); *G06F 2212/312* (2013.01)

(58) Field of Classification Search
  CPC ........ G06F 21/64; G06F 21/78; G06F 21/606; G06F 16/188; G06F 12/02; G06F 12/10; G06F 16/1748; G06F 21/6209; G06F 12/1081; G06F 3/0608; G06F 3/0641; G06F 3/0689; G06F 16/1744; G06F 11/1402; G06F 2201/805; G06F 17/30153; G06F 17/30156; G06F 12/109; G06F 12/1036; G06F 12/1009; G06F 2212/151; H04L 9/0631; H04L 9/0643; H04L 63/0428; H04L 9/0863; H04L 63/061; H04L 63/062; H04L 63/18; H04L 9/0618; H04L 2209/30; H04L 2209/34
  See application file for complete search history.

(56) References Cited

U.S. PATENT DOCUMENTS

| | | | | |
|---|---|---|---|---|
| 8,407,428 | B2 * | 3/2013 | Cheriton | G06F 12/02 |
| | | | | 711/153 |
| 8,645,663 | B2 * | 2/2014 | Kagan | G06F 12/1081 |
| | | | | 709/212 |
| 8,751,763 | B1 | 6/2014 | Ramarao | |
| 9,223,799 | B1 * | 12/2015 | Veeraswamy | G06F 16/188 |
| 2004/0215962 | A1 | 10/2004 | Douceur et al. | |
| 2009/0013149 | A1 * | 1/2009 | Uhlig | G06F 12/109 |
| | | | | 711/207 |
| 2009/0268903 | A1 | 10/2009 | Bojinov et al. | |
| 2010/0313040 | A1 * | 12/2010 | Lumb | G06F 3/0608 |
| | | | | 713/193 |
| 2011/0238634 | A1 | 9/2011 | Kobara | |
| 2012/0166401 | A1 | 6/2012 | Li et al. | |
| 2013/0036289 | A1 | 2/2013 | Welnicki | |
| 2013/0067193 | A1 * | 3/2013 | Kagan | G06F 12/1081 |
| | | | | 711/206 |
| 2015/0271146 | A1 * | 9/2015 | Holyfield | H04L 63/0428 |
| | | | | 713/171 |

OTHER PUBLICATIONS

Office Action dated Nov. 14, 2018 for Chinese Application No. 201580003112.5, 9 pages.
Office Action dated Apr. 18, 2018 for Chinese Application No. 201580003112.5, 31 pages.
Halevi et al. "A parallelizable enciphering mode." Topics in Cryptology-CT-RSA 2004. Springer Berlin Heidelberg, 2004. 292-304.
Douceur et al. "Reclaiming space from duplicate files in a serverless distributed file system." Distributed Computing Systems, 2002. Proceedings. 22nd International Conference on. IEEE, 2002.
International Search Report and Written Opinion dated Apr. 8, 2015, issued in corresponding International Application No. PCT/US2015/011341, 10 pages.
International Preliminary Report on Patentability dated Jul. 28, 2016, issued in corresponding International Application No. PCT/US2015/011341, 8 pages.
Notice of Preliminary Rejection dated Mar. 21, 2017, issued in corresponding Korean Patent Application No. 10-2016-7015977, 10 pages.
Non-Final Office Action dated Nov. 30, 2016, issued in related U.S. Appl. No. 14/596,113, 29 pages.
Notice of Allowance dated Jun. 5, 2017, issued in related U.S. Appl. No. 14/596,113, 13 pages.

* cited by examiner

| Translation Line | IV | PLID | PLID | ... | PLID | Encrypted Contents |
|---|---|---|---|---|---|---|
| 100 | 259 | 3 | 40 | ... | 99 | AZ95MKP0 |
| ... | ... | ... | ... | ... | ... | ... |
| 502 | 802 | 3 | 40 | ... | 99 | MPLLR092 |
| 503 | 243 | 98 | 2 | ... | 71 | REW10832 |
| ... | ... | ... | ... | ... | ... | ... |

FIG. 6

| Index | Signature | Reference Count | Contents |
|---|---|---|---|
| ... | ... | ... | ... |
| $(A_i-B_i)/S$ | Hash("hello") | 2 | "hello" |
| $(A_{i+1}-B_i)/S$ | Hash("world") | 4 | "world" |
| ... | ... | ... | ... |

FIG. 7A

| Index | Signature | Reference Count | Contents |
|---|---|---|---|
| ... | ... | ... | ... |
| $SecHash_1(En("hello"))$ | $SecHash_2(En("hello"))$ | En(2) | En("hello") |
| ... | ... | ... | ... |

FIG. 7B

DEDUPLICATION-BASED DATA SECURITY

CROSS-REFERENCE TO RELATED APPLICATIONS

This application is a continuation application of U.S. application Ser. No. 14/596,113, filed Jan. 13, 2015, which claims priority to U.S. Provisional Patent Application No. 61/927,914, entitled "DEDUPLICATION-BASED MEMORY ENCRYPTION," filed Jan. 15, 2014, the disclosures of which are incorporated herein by reference for all purposes.

BACKGROUND OF THE INVENTION

Secure computer systems require secure memory to prevent attacks by intruders with access to the computer's main memory. For example, in a so-called cold boot attack, an attacker is able to extract data content from dynamic random access memory (DRAM) in the main memory without the memory losing its contents. Therefore, security is compromised if there is sensitive plaintext information stored in the memory. Dual-ported DRAM means that an attacker may be able to observe the read and write traffic in DRAM during system operation. The use of non-volatile random access memory (NVRAM) to realize main memory means that data is preserved in the main memory and vulnerable to attacks requiring less effort than a cold-boot attack.

Presently, conventional stream encryption is deemed to be unsuitable for secure memory encryption. This is because the conventional stream encryption technique requires seeding the encryption with a pseudo-random value to prevent two instances of the same data encrypting to the same cipher text. Without this provision, an attacker is able to do a frequency analysis attack by observing the number of occurrences of the same cipher text. The overhead of storing this seed or initialization vector (IV) as well as the overhead for setting up the encryption or decryption to use this IV typically require relatively large amounts of data as units of encryption. For example, using a 16-byte IV means that encrypting at the granularity of a conventional page size of 4 kilobytes imposes a space overhead for the IV of just 0.1 percent. However, if the unit of encryption is a cache line, as is required between the processor cache and main memory, there would be a significant cost to retrieve and setup for each encryption or decryption action. For instance, the conventional cache line size is 64 bytes, thus a 16-byte IV would result in a 25 percent space overhead.

Secure data integrity also calls for large units for similar reasons. In particular, conventional approaches call for a 128 bit message authentication code (MAC) per data unit. As such, using a large unit such as a page amortizes the overhead of this MAC, but a cache line unit would incur significant overhead in addition to the IV overhead identified above.

In a standard security/threat model for computers, it is assumed that the processor chip itself is made secure and can restrict an attacker from modification of this silicon and from accessing protected data that is resident inside of the processor chip. (For instance, a processor chip can be designed to destruct or delete its contents if there is an attempt to modify the chip or perform unsupported operations.) In particular, data stored in the L1, L2, etc. to last-level cache can be stored in the clear without risk of exposure or compromise, allowing the processor to operate on data without having to decrypt data on each operation and then re-encrypt the results immediately after they are generated. In addition, other metadata resident on the processor chip's cache can similarly be protected by the physical security of this chip as well as its secure design. However, the amount of such data is significantly limited by the physical constraints on the processor chip, including power and cost limitations, to a fraction of that available in main memory. For example, currently an on-chip cache state is typically limited to tens of megabytes whereas a main memory can easily be tens of gigabytes or larger, a factor of 1000 larger. On the other hand, data stored off the processor chip is assumed to be accessible to the attacker by, for instance, removing the DRAM itself, or coupling into a second port to the DRAM, as described earlier.

Thus, there is a need to efficiently encrypt and decrypt memory line units while providing strong confidentiality and integrity of the data.

BRIEF DESCRIPTION OF THE DRAWINGS

Various embodiments of the invention are disclosed in the following detailed description and the accompanying drawings.

FIG. 6 is a diagram illustrating an example data structure comprising an initialization vector (IV).

FIG. 7A is a data structure diagram illustrating an example of the metadata used to support the structured memory in a conventional implementation.

FIG. 7B is a data structure diagram illustrating an example of the metadata used to support the structured memory in a secure implementation.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Computer security using encryption and decryption of a deduplicated storage is disclosed. In some embodiments, in response to a request to write data content to a storage, encrypted data content based on the data content is generated. An attempt is made to obtain a reference to the encrypted data content in the storage. In the event that the reference to the encrypted data content is obtained, a translation line is modified to refer to the reference to the encrypted data content in the storage. In the event that the reference to the encrypted data content is not obtained, the encrypted data content is stored at a new location; a reference to the encrypted data content stored at the new location is obtained; and the translation line is modified to refer to the reference to the encrypted data content stored at the new location.

Figure 1:
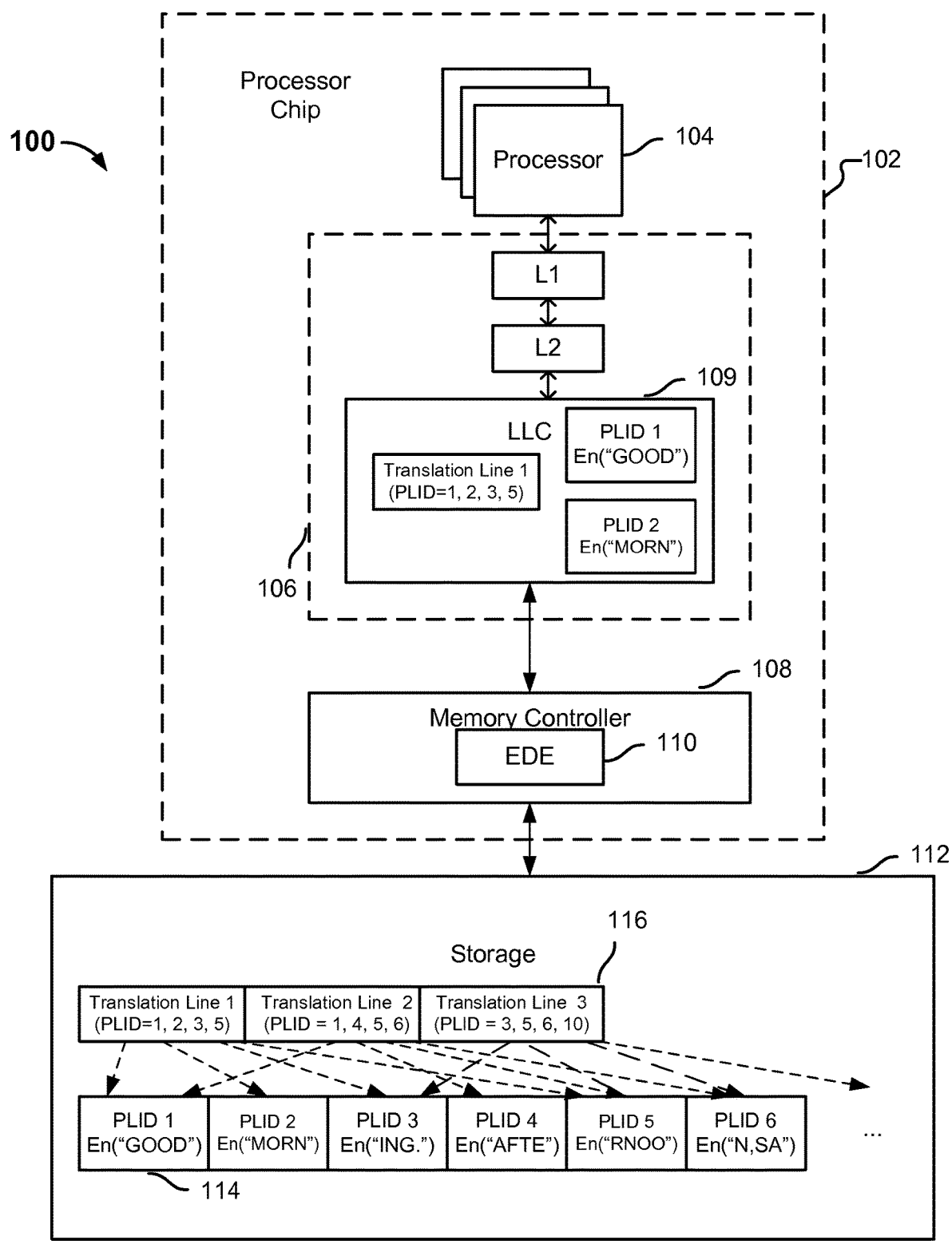
FIG. 1 is a block diagram illustrating an embodiment of a system that supports deduplicated, encrypted data content.

FIG. 1 is a block diagram illustrating an embodiment of a system that supports deduplicated, encrypted data content. In this example, system 100 includes a processor chip 102 connected to a storage 112. Processor chip 102 has a number of circuitry components, including one or more processor cores 104 connected to a hierarchical cache 106. A three-level cache hierarchy is illustrated in this example, but other cache hierarchies with different levels of caches can be used. Inside the cache, data and code is stored as unencrypted clear text. The cache (specifically, last level cache (LLC) 109) is connected to a memory controller 108, which includes one or more communications interfaces and an encryption/decryption engine (EDE) 110.

The memory controller is connected to storage 112. In various embodiments, storage 112 includes one or more memory devices (also referred to as main memory) such as dynamic random-access memory (DRAM), static dynamic random-access memory (SRAM), phase-change memory (PCM), Random Access Memory (RAM); one or more secondary storage devices such as a non-volatile random access memory (NVRAM), an optical or magnetic disk, a flash drive; or a combination of one or more memory devices and secondary storage devices. For purposes of illustration, examples with the storage implemented using physical memory are discussed extensively below, although the techniques are also applicable to storage implemented using secondary storage devices, or a combination of memory and secondary storage.

In this example, memory controller 108 and storage 112 together implement a structured memory such as the Hierarchical Immutable Content Addressable Memory Processor (HICAMP™) by Hicamp Systems of Menlo Park, Calif. Other appropriate data line-based memory architectures can be used. Each data line is configured to store content that remains unchanged until the data line is deallocated and reallocated with new content. The implementation and operations of a structured, deduplicated memory such as HICAMP are known to those skilled in the art.

As shown, a portion of the storage includes an array of small (e.g., on the order of a few to a few hundred bytes) data lines 114. Each data line is addressed by a data line identifier (PLID). In some embodiments, each data line has contents that remain immutable for the life of the line. In other words, once a data line is created and populated with data, its contents do not change until the memory is deallocated and reallocated to have different contents. In some embodiments, the data content of each data line is deduplicated. In other words, each data line has data content that is unique.

In this example, each data line includes a block of encrypted data content. A stored and encrypted data line is accessed with a level of indirection, allowing two or more separate addresses to refer to the same actual data line. Further, encrypted data lines are deduplicated. Details of the indirect access and deduplication are described below. In some embodiments, strict deduplication is not required and different data lines are permitted to store the same contents under certain circumstances. Potentially duplicated data lines are kept separate from deduplicated data lines.

In some embodiments, the level of indirection for accessing the data lines is provided using translation lines. In the diagram shown, a portion of storage 112 stores translation lines 116. The translation lines (also referred to as indirect lines) form a logical organization of an ordered set of data lines that includes specific content (e.g., content of the page). A translation line is said to reference a set of data lines, which means that the indirect line can include the addresses or identifiers of the data lines (e.g., the PLIDs of the data lines), or otherwise be associated with its corresponding set of data lines. In the example shown, the translation line includes multiple entries that include PLID values for the corresponding data lines. Since the data lines are deduplicated, the translation lines reference the same data line for the same data content. For example, translation lines 1 and 2 both reference a data line with the PLID of 1.

The format, size, and number of translation lines and data lines shown in this and other examples are for purposes of illustration only and can vary in other embodiments. For example, in some embodiments, each data line is 64 bytes, and each indirect line is 256 bytes (which includes 64 4-byte entries each containing an identifier (or address) for a sharable data line). Although fixed sizes are discussed in the examples below, in some embodiments, variable sizes are allowed (for example, a system may support multiple modes where the unit sizes vary for different modes). In some embodiments, additional metadata is included in the data lines and/or translation lines. In some embodiments, the data lines are arranged in a content directory where the data lines are addressable by looking up their contents in the directory.

In some embodiments, the storage is accessed as a number of segments, where each segment is a logically contiguous sequence of data lines and is structured as a directed acyclic graph ("DAG") of data lines. A segment table maps each segment to the PLID that represents the root of the DAG. Segments are identified and accessed by segment identifiers ("SegID"). Special-purpose registers in the processor (referred to as iterator registers) allow efficient access to data stored in the segments, including loading data from the DAG, iteration, prefetching, and updates of the segment contents.

In the example shown, the contents of a data line include encrypted data content, represented as En(x), where x is the unencrypted data content. Because the data content of each data line is deduplicated and unique, a specific piece of content (e.g., the encrypted version of "GOOD" or En("GOOD")) only appears once among the data lines. Because of the deduplication of encrypted blocks, well-known attacks on block encryption, specifically frequency analysis attacks, will not succeed because at most one copy of a given piece of data content is stored. This deduplication means that the block encryption approaches such as Encrypted Media Extensions (EME) can be applied to data blocks, relying on the extensive research that shows that EME is secure for "unique messages." In this application, the deduplication mechanism ensures that the data lines include unique messages as contents.

In some embodiments, the translation lines are also encrypted. Details of how to encrypt, decrypt, and access the data line contents and/or translation lines are described below.

The memory controller supports memory deduplication using a content directory-based technique described in greater detail below. Translation lines and data lines are loaded into, written back to, or evicted from cache 106 as needed. The EDE in the memory controller encrypts data that is obtained from cache 106 and to be stored in storage 112, and decrypts data that is retrieved from storage 112 and to be transferred to cache 106.

The modules such as the memory controller and EDE described above can be implemented as software components executing on one or more processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present application. The modules may be implemented on a single device or distributed across multiple devices. The functions of the modules may be merged into one another or further split into multiple sub-modules.

Figure 2A:
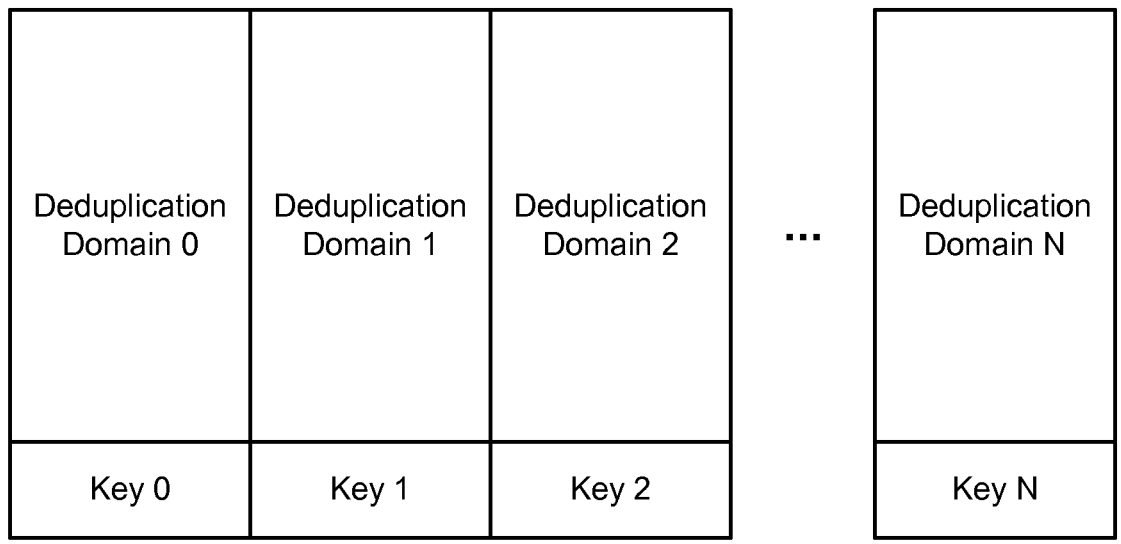
FIGS. 2A and 2B are data structure diagrams illustrating embodiments of multiple deduplication domains.
Figure 2B:
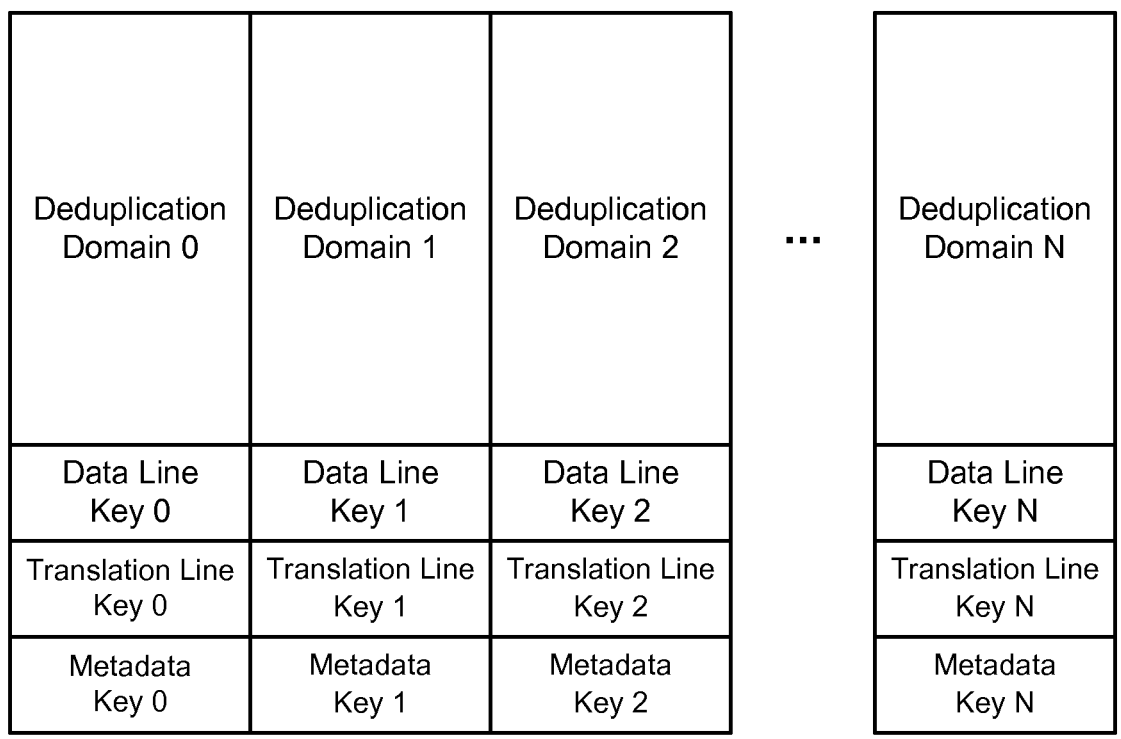

FIGS. 2A and 2B are data structure diagrams illustrating embodiments of multiple deduplication domains. Details of the data structures shown in FIGS. 2A and 2B are discussed below.

Figure 3:
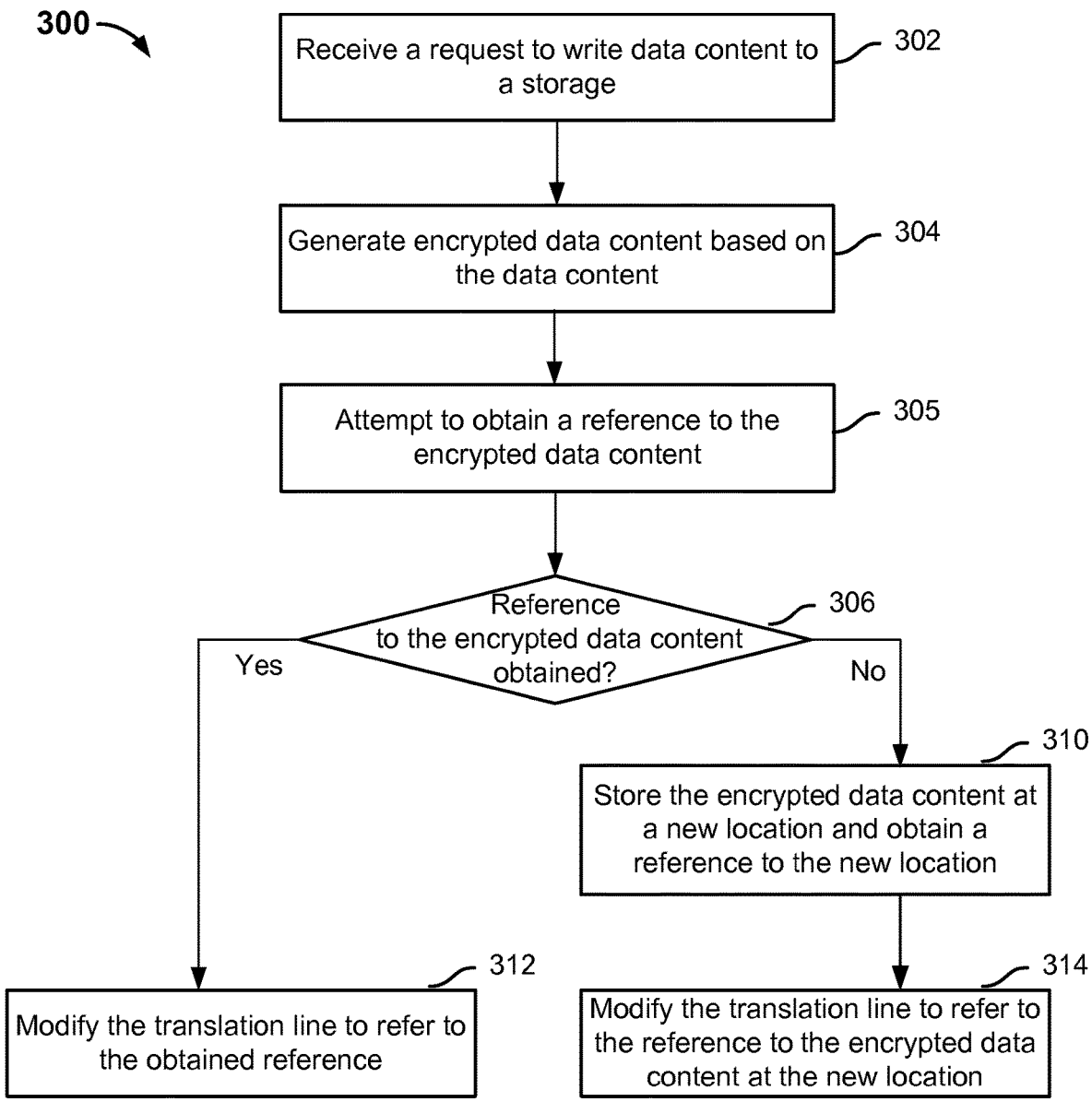
FIG. 3 is a flowchart illustrating an embodiment of a process for writing data to storage.

FIG. 3 is a flowchart illustrating an embodiment of a process for writing data to storage. Process 300 can be performed on a system such as 100, and in particular by memory controller 108.

At 302, a request to write certain data content to a storage is received. In some embodiments, the request is issued by the processor and received by the memory controller. In some embodiments, the request specifies a physical address in the main memory, and in response to the request, the memory controller translates the physical address to a reference to a translation line entry by looking up in a mapping table, applying a translation function, or any other appropriate techniques. For example, the request may involve writing the data content "hello" to a physical address of 1100. The memory controller will perform a translation and determine that the first entry of a translation line with the identifier of 110 corresponds to this physical address.

At 304, in response to the request, encrypted content is generated based on the data content being written. In some embodiments, an encryption function En(x) is applied to the data content x to generate an encrypted output. In this example, the encrypted content is represented as En("hello"). En(x) can require additional input parameters such as a security key and/or an initialization vector (IV) value, which are obtained as necessary. In some embodiments, a security key is stored in a known location such as a specific register. In embodiments where multiple domains are used, an appropriate key is selected for the current domain.

A variety of encryption techniques can be implemented. In some embodiments, the EDE performs a deterministic encryption function to generate the encrypted data content. A deterministic block encryption scheme (as opposed to a probabilistic encryption scheme) always produces the same cipher text for a given block of input data. A separate encryption key or IV is not needed for the data lines because the data lines are deduplicated and store different encrypted results, and thus invulnerable to frequency analysis attacks. In some embodiment, the EDE in the memory controller implements the Advanced Encryption Standard (AES) technique to provide block encryption for a block size of 16 bytes. In some embodiments, the EDE implements the ECB-Mix-ECB (EME) technique to construct a wide-block secure pseudo-random permutation (PRP) that handles the 64 byte cache lines of a conventional processor. The strong parallelizability of EME allows multiple independent hardware submodules to perform the decryption in parallel, thereby minimizing the latency for cache miss. The same can be applied to encryption, which reduces the cache line eviction time. EME can be applied to support a larger cache line size as well as a smaller cache line size than what is shown in the examples. Although techniques such as AES and EME are discussed extensively for purposes of example, other appropriate encryption/decryption techniques can be used. For example, XEX-TCB-CTS (XTS), CBC-Mask-CBC (CMC) and other length-preserving encryption/decryption techniques can be used in other embodiments.

At 305, an attempt to obtain a reference to the encrypted data content is made. In various embodiments, the reference can be a pointer, an address, a handle, an identifier, or any other appropriate indication to access certain content. In some embodiments, an attempt to obtain a reference to the encrypted data content involves performing an operation to obtain a reference given the encrypted data content. For example, a lookup operation of the encrypted data content En("hello") is performed. In some embodiments, such an operation is supported by the structured memory implementation.

At 306, it is determined whether the reference to the encrypted data content is successfully obtained. If the encrypted data content already exists in the storage, then the reference to the encrypted data content can be successfully obtained. For example, if En("hello") already exists in the storage and the data line storing this content has a PLID of 14, then a PLID of 14 referencing the existing encrypted content En("hello") is obtained. As will be described in greater detail below, in some embodiments, the encrypted data content is stored in a content directory/hash table that permits quick lookup of specific content.

If the reference to the encrypted data content is successfully obtained, at 312, the translation line is modified to refer to the obtained reference. In some embodiments, the translation line stores the reference itself; in some embodiments, the translation line stores an address, pointer, handle, or the like that is associated with the reference. In this example, the first entry of translation line 110 (which corresponds to the requested physical address of 1100) is modified to refer to the obtained reference, which is PLID 14.

If, however, the encrypted content does not already exist in the storage and a reference to the encrypted data content is not obtained, then, at 310, the encrypted content is stored at a new location and a reference to the encrypted content stored at this new location is obtained. For example, if it is determined that En("hello") does not already exist in the storage, then a new data line with a PLID of 19 is created to store En("hello"), and PLID 19 is obtained. At 314, the translation line is modified to refer to the reference to the encrypted content stored at the new location. In this example, the first entry of translation line 110 (which corresponds to physical address 1100) is modified to refer to PLID 19.

Figure 4:
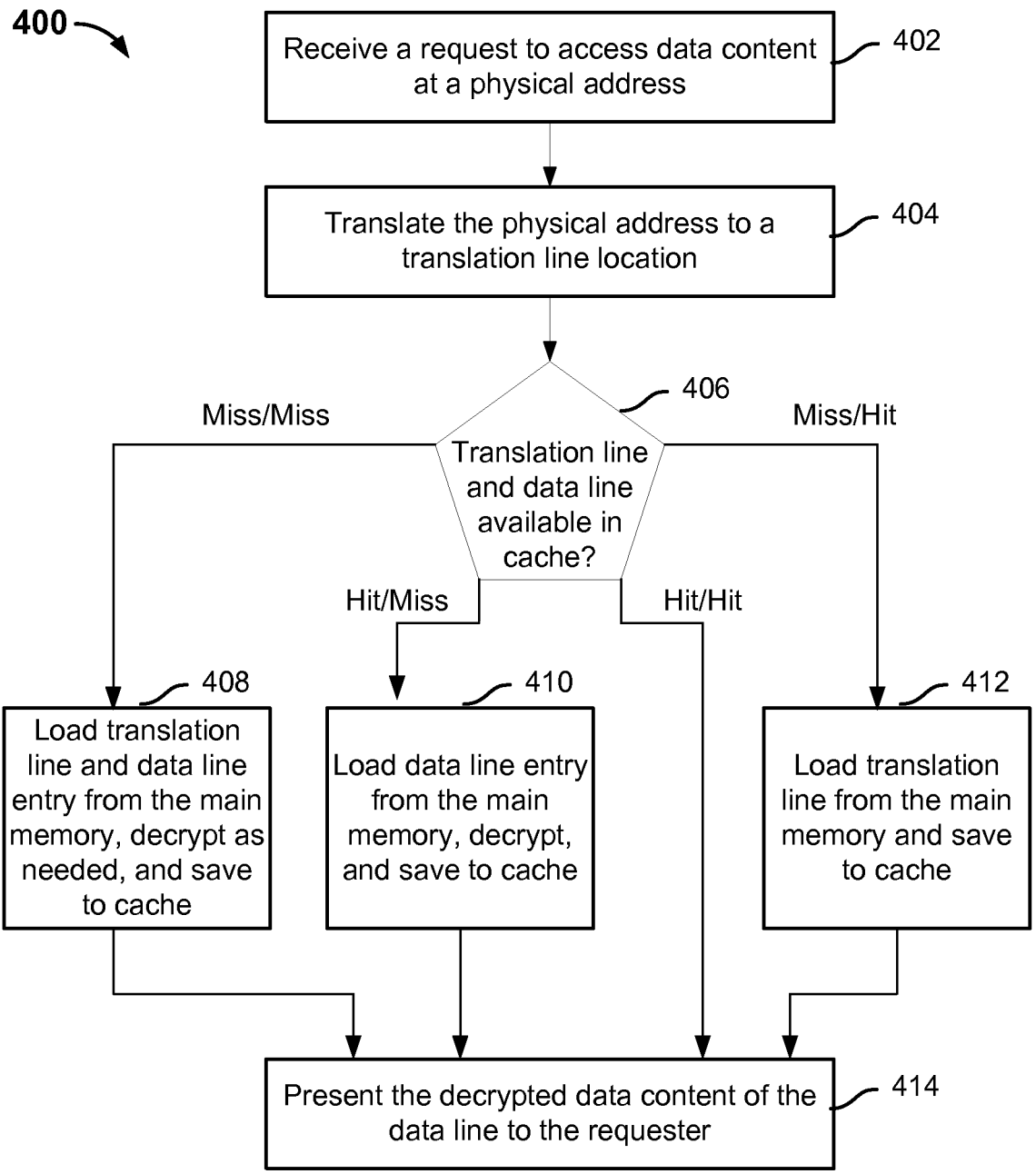
FIG. 4 is a flowchart illustrating an embodiment of a process for reading data from a location in the storage.

FIG. 4 is a flowchart illustrating an embodiment of a process for reading data from a location in the storage. Process 400 can be performed on a system such as 100, and in particular by memory controller 108.

At 402, a request to access data content at a location (also referred to as a read location) is received. In some embodiments, the request is made by the processor and the location specified in the request corresponds to a physical address in the main memory.

At 404, the physical address is translated to a translation line location (e.g., the address of an entry in a translation line) by looking up in a mapping table, applying a translation function, etc. For example, a request for data content at physical address 1200 may correspond to entry 2 of translation line 120, which stores a PLID of 19.

At 406, in response to the request, it is determined whether the data content is available in the cache. Specifically, the availabilities of the translation line and the corresponding data line with the PLID in the cache are checked. There are four possibilities: miss/miss (i.e., neither the translation line nor the data line is available in the cache); hit/miss (i.e., the translation line is available in the cache but the data line is not); hit/hit (i.e., both the translation line and the data line are available in the cache); and miss/hit (i.e., the translation line is not available in the cache but the data line is available in the cache).

At 408, the miss/miss case is handled. Specifically, the translation line and the data line with the PLID are both loaded from the main memory, and decrypted as necessary. For example, if neither translation line 120 nor data line of PLID 19 is available in the cache, then translation line 120 (including its PLID entries) is loaded from the storage into the cache, and the data line of PLID 19 with its corresponding encrypted contents is also loaded from the main memory, decrypted, and the decrypted result is saved into the cache. In some embodiments, contents of all the entries in translation line 120 are decrypted and loaded into the cache; in some embodiments, only the contents of the specific data line entry that is requested (in this case, PLID 19) are decrypted and loaded into the cache. The data in the cache is then presented to the requester. In some embodiments, translation lines are not deduplicated and thus require protection from frequency analysis attacks. Encryption/decryption techniques using IVs, MACs, or other secure memory techniques can be used to protect the translation lines.

At 410, the hit/miss case is handled. Specifically, the translation line already exists in the cache, and the encrypted contents for the data line are loaded from the main memory, decrypted, and saved to the cache. For example, if translation line 120 already exists in the cache but data line with PLID 19 does not, then the data line's encrypted contents are loaded from the main memory, decrypted, and saved into the cache. Note that in embodiments where the contents of all the entries in a translation line are decrypted and loaded into the cache in a miss/miss situation, it is likely that once a translation line already exists in the cache, so do its corresponding PLID entries, thus making the hit/miss scenario relatively rare.

At 414, the hit/hit case is handled. In such a case, both the translation line and the data line exist in the cache and no additional retrieval from the main memory is needed. The data content of the data line in the cache is presented to the requester. Note that decryption is not needed since what is stored in the cache is decrypted clear text.

At 412, the miss/hit case is handled. In such a case, the translation line is loaded into the cache, but the data line does not need to be read or translated as it already exists in the cache.

At 414, the data content of the data line in the cache is presented to the requester. For example, the decrypted data content of PLID 19 in the cache are presented to the requester.

The cache access process is efficient because: i) the translation line and its corresponding data lines are often found in the cache, making the hit/hit scenario quite common; ii) the encryption key is common across the process executing on the processor so does not need to be retrieved from outside the processor core on each usage, and iii) access to the main memory is avoided in most cases because the processor access is satisfied from the processor cache, in which the data is stored in plaintext. Therefore, in these cases, decryption or main memory access before usage is not required.

In some embodiments, the EDE is implemented to generate a secure pad on cache line miss (and thus fetch from encrypted memory) concurrently with fetching the encrypted memory line. As used herein, the secure pad refers to a sequence of binary values that functions as a mask during decryption. Techniques for generating the secure pad are known to those skilled in the art. The decryption then requires a simple XOR of the encrypted line with the secure pad to produce the plaintext data once the encrypted data line is received from main memory, thereby minimizing the latency impact of decryption.

Figure 5:
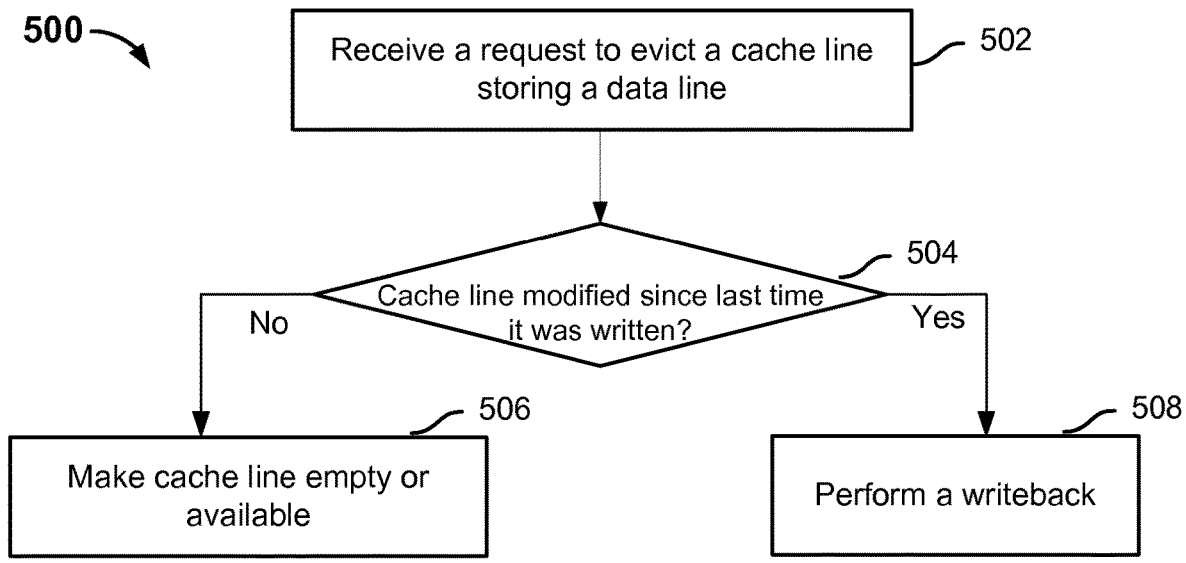
FIG. 5 is a flowchart illustrating an embodiment of a process for evicting a data line from cache.

Since cache space is limited, existing data in some cache lines needs to be evicted from time to time to make cache lines available for new data. Modified data in the cache lines to be evicted should be written back to the storage. FIG. 5 is a flowchart illustrating an embodiment of a process for evicting a data line from cache. Process 500 can be performed on a system such as 100, and in particular by memory controller 108.

At 502, a request to evict a cache line storing a data line is received. For example, a request to evict a cache line storing a data line with the PLID of 21 and the data content of "hello" is received.

At 504, it is determined whether the cache line has been modified since its contents were last written to the storage (e.g., main memory). In some embodiments, there is a "dirty" flag that is set whenever a data line is modified. The determination is made by checking this flag.

If it is determined that the cache line storing the data line has not been modified since its contents were last written to the storage, at 506, the data line can be removed from the cache and the cache line is made empty or marked as available. The eviction process is terminated.

If, however, it is determined that the cache line storing the data line has been modified since its contents were last written to the storage, the modification should be written to the storage. A writeback operation is performed at 508. In this example, the writeback operation is the same as process 300 of FIG. 3, where the modified content in the cache line is written to the storage.

In the examples above, data lines in the storage are encrypted and deduplicated. In some embodiments, the cache (e.g., the LLC) also supports deduplication by implementing the same content directory-based lookup mechanism that determines whether specific data content already exists in the cache, thus reducing the demand on the cache resources (e.g., cache space) by eliminating duplicates at the cache level.

Using the technique described above, the processor can implement efficient low latency decryption of memory lines on cache miss, and similarly for encryption on writeback, while ensuring highly secure encryption of data in memory and scaling to large amounts of main memory.

Encrypted Translation Lines

In the examples discussed above, the translation lines are not encrypted. In some embodiments, the translation lines are encrypted. Thus, to access a translation line that is not in the LLC is handled by performing similar steps for data lines, i.e., decrypting the translation line when loading this line into the LLC. Similarly, writing back a modified translation line entails encrypting the translation line into its encrypted form.

Note that translation lines are not necessarily deduplicated. FIG. 6 is a diagram illustrating an example data structure comprising an initialization vector (IV). An IV value includes a randomized parameter used by the EDE during encryption. When the same data content is encrypted using different IV values, the resulting encrypted results are different. In this example, each translation line includes an IV field, and non-deduplicated translation lines are assigned different IV values. For example, translation lines 100 and 502 have the same contents but are assigned different IV values. In some embodiments, the EDE performs deterministic block encryption. As shown, translation lines comprising the same data yield different encrypted results because different IV values are used as a part of the input by the encryption engine, thus securing the translation lines from frequency analysis attacks. Moreover, because the translation lines are a small percentage of the overall memory, including an IV value per translation line does not introduce significant space overhead.

In some embodiments, in addition to the IV, a key is required by the EDE to perform encryption/decryption. The key can be stored in a register or other known location to minimize space or access overhead.

In some embodiments, the key that is used for translation lines is different from the key used for data lines.

In some embodiments, there are multiple sets of translation lines, and a separate key is used by a separate set of translation lines. In some embodiments, separate keys are used for different translation lines in different protection domains. For example, multiple sets of translation lines are allocated for different processes on a machine, and a separate key is used for a separate set of translation lines corresponding to each process. As another example, the processor's address space can be divided into different segments, where some segments are shared by multiple processes. Thus, a shared segment is encrypted by using a key that is shared among the processes that can access the shared segment and private segments are encrypted using private, unshared keys. Other allocations of multiple sets of translation lines are possible.

Encrypted Content Directory Metadata

FIG. 7A is a data structure diagram illustrating an example of the metadata used to support the structured memory in a conventional implementation. In this example, the structured memory is supported by a content directory 800, which is a hash table in the main memory storing the data content and corresponding metadata such as the signature of the entry. To determine whether specific data content already exists in memory, the data content is hashed and looked up in the hash table. Therefore, there is effectively a hash index associated with each data line. For instance, in a conventional system that does not involve encryption, a line allocated at address Ai can be determined to be associated with the bucket by subtracting from Ai the base address of the hash table (Bi), and dividing the result by the size of the bucket (S). The metadata includes the hash index.

In this example, the metadata includes a signature associated with each entry in the hash bucket, computed as a separate hash of the data content, used as a secondary index to look up the specific entry in the hash bucket.

In this example, there is a reference count per data line entry, indicating the number of translation lines that reference this entry. When the reference count reaches zero, the data line can be garbage collected and its memory freed.

FIG. 7B is a data structure diagram illustrating an example of the metadata used to support the structured memory in a secure implementation. In this example, the metadata values are encrypted so that unauthorized modification can be detected. Specifically, the hash index is computed using a secure keyed hash (SecHash) on the encrypted data content (En("hello")). The encrypted data content is stored at a location in the table that corresponds to the hash index, and lookup of the encrypted content is performed using this hash index. The associated signature line is computed similarly. In some embodiments, the hash index and the signature are different truncated portions of a secure keyed hash, e.g., hash-based message authentication code (HMAC). Similarly, the reference counts can be encrypted. A mismatch of the data content and metadata indicates that there is potentially a security violation such as an unauthorized modification.

In other embodiments, different metadata structure and lookup processing can be used. For example, in some embodiments, a hash is computed on the unencrypted data content of the data line. The data content is then encrypted and stored at the computed location (i.e., the location in the hash table that corresponds to the unencrypted data content). In such embodiments, to look up the encrypted content or to obtain a reference to the encrypted data content of a data line, the encrypted data content is decrypted, and the hash entry location is determined based on the decrypted result.

Data Key Domains

In some embodiments, separate protection domains use separate data encryption keys to encrypt the data lines. This provides increased protection between these domains. As used herein, a protective domain refers to a region of memory within which the data lines are only accessible to selective processes.

In some embodiments that use separate keys for data lines in separate domains, the data lines are stored in a common shared content directory (e.g., a common hash table) in the main memory. It is possible for two lines of distinct content to encrypt under the two different keys to the same encrypted data content. Thus, different protection domains can, in principle, end up sharing the same entry in the content directory. For example, for data domain 1, the encryption result of the data content "hello" is "xyz123"; for data domain 2, the encryption result of the data content "world" is also "xyz123." Only one instance of "xyz123" is stored in the main memory.

In some embodiments, a common data encryption key is used, allowing data to be copied without decrypting and re-encrypting again even between different protection domains. Only the affected translation lines in different domains need to be decrypted and re-encrypted as the translation lines are protected using different keys in different domains. Thus, the amount of decryption and re-encryption processing required is reduced.

In some embodiments, certain domains are shared and encrypted using a shared key. For example, two separate processes can both accessing some secure, encrypted data that is shared; by providing a common shared key for a common domain, both processes can decrypt the same data. On the other hand, data that is kept private is encrypted using a private key that is not shared.

In some embodiments, the encrypted contents are encrypted using separate keys, but the metadata associated with the content directory is encrypted using a common key that is shared across the protection domains sharing this content directory. By sharing the common key for the metadata, each protection domain can access and update the metadata associated with the duplicated entry, such as the signature line associated with a bucket, the reference count, etc.

If a shared metadata key is not acceptable between certain protection domains, an embodiment can support separate deduplication domains, as described next.

Deduplication Domains

In some embodiments, the processor's address space is divided into multiple deduplication domains. As used herein, a deduplication domain refers to a region of memory within which the data lines are deduplicated and have unique contents. The processor searches for an existing copy of given data content within one deduplication domain.

In some cases, there can be more than one instance of a given data block in memory. However, the frequency of a given data block across the deduplication domains is still independent of the frequency of a given data block in the overall application, thereby preventing frequency-based analysis and attack. Further, separate deduplication domains can use separate keys, therefore the same contents in each domain is not stored as the same value. In other words, the frequency of given cipher text (e.g., the encrypted contents of a data line) is not dependent on the frequency of occurrence of any particular plaintext.

In some embodiments, each deduplication domain uses a separate secret key to encrypt data lines used in the deduplication domain, so that an application in a deduplication domain (or an attacker who is able to gain access to the memory in a deduplication domain) is not able to decrypt data in a separate deduplication domain. In some embodiments, a system is configured with multiple deduplication domains, one for each separate protection domain.

FIG. 2A is a data structure diagram illustrating an embodiment of multiple domains. As shown, separate secret keys are used for different domains to encrypt data lines. The keys have different values and can be stored in pre-specified registers. In some embodiments, the keys have different formats. For example, a 128-bit key can be used for one domain, and a 256-bit key can be used for a different domain. What constitutes a domain depends on implementation and can vary in different embodiments. For instance, a separate user can correspond to a separate domain, and a separate key can be used to encrypt/decrypt the data lines in each corresponding domain. Other allocations of protection domains (such as separate domains for separate processes) are possible. In this example, data lines are deduplicated in each domain but not necessarily across domains; thus, there can be duplicated data lines in separate domains. When the memory controller needs to encrypt or decrypt data, the key associated with the current domain is accessed and used for encryption or decryption. Using separate keys to encrypt separate deduplication domains improves the protection between deduplication domains and ensures that the same data content in different domains is encrypted differently, thus providing extra protection against frequency analysis attacks.

In the embodiment of FIG. 2B, each deduplication domain optionally uses a separate translation line key to encrypt the data used for translation lines, and a separate metadata key to encrypt the metadata associated with the content directory. The keys have different values and can be stored in pre-specified registers.

Preventing Timing Attacks

In some embodiments, the timing of writeback operations is artificially modified to change the indicated amount of time used to perform the write operation, so that there is no discernible difference between the amount of indicated amount of time for writing to deduplicated memory when the content already is stored in memory, when the content does not already exist and a new memory line needs to be allocated, or when a memory line is being written to an overflow area.

One approach is to delay the completion indication of each write by the maximum time required by any of these operations. This approach should not have a significant negative impact on application performance because most writebacks are "posted" (i.e., take place asynchronously relative to application execution) and the additional delay typically does not reduce the memory writeback throughput.

Memory Integrity

An additional requirement for some secure systems is to ensure the integrity of data against an attacker that is assumed to be able to modify encrypted data while the system is running.

In this application, to support deduplication, the content directory includes metadata, explicitly or implicitly, that aids in determining the location of the data by content (as part of content lookup), as described above.

As described above, in some embodiments, the metadata allows the location of the data line in a particular hash bucket (i.e., the hash bucket index) to be computed.

In some embodiments, a memory integrity check includes, on read access to a data line, checking the contents of the data line to ensure that the data content matches the metadata associated with the data line. The PLID (or equivalently, the address to be accessed) and the data content are already available on read access, allowing the integrity check to be carried out without any additional memory access. In particular, the hash index of the data line is recomputed and compared to the hash bucket in which the data line is located. The signature, which is computed based on the data line contents and determines the entry in the bucket, is similarly recomputed and checked against the entry. If the computed hash index does not match the data line location in the hash bucket, or if the computed signature does not match the signature of the entry in the hash bucket, it indicates that memory integrity has been compromised.

Thus, an attacker can only modify the data without detection (in other words, without violating data integrity) if it is able to modify the data content so that the modified data content continues to match the associated metadata.

Further, in some embodiments, on content lookup or logical write, there is already a requirement to check that the content in a data line entry actually matches the content to be written back, so there is already an integrity check in this case.

Further, in some embodiments, on content lookup, the data integrity of a data line entry relative to its metadata is also checked by computing the metadata based on the data content and comparing the results with the stored metadata.

In some embodiments, the hash index metadata and signature metadata are generated by a secure keyed hash function, as described earlier. Thus, in such an embodiment, an attacker that modifies an encrypted data line cannot determine if the modified encrypted data matches this metadata without knowing the metadata key. If the attacker instead is able to forge a reference to the modified data line and then attempts to access this line, the system will detect an integrity violation by computing the metadata based on the data content and detecting that the metadata and the data content do not match. A potential security violation is reported. Because of the use of secure hashes in the hash table, an intruder that attempts to make an unauthorized modification to a line by guessing a value that matches the current bucket location will likely fail to guess the correct value, thus triggering an alert (such as a log or a message) indicating that there is a security violation.

As discussed above, a data integrity check is provided without extra space cost.

Overflow Handling

In some embodiments, the storage has an overflow area. In such embodiments, on writeback, if there are no free entries in the content directory hash bucket to which the content is mapped, the memory line is written to the overflow area.

In some embodiments, the overflow area does not deduplicate lines. Therefore it is possible for two or more instances of the same data to be stored in an overflow area associated with a deduplication domain. To securely handle overflow lines, extra metadata such as a separate IV is stored per overflow data line and used to encrypt the data content of the data line. Because the same data content encrypted using different IVs results in different encrypted results, the line-level encryption is guaranteed not to be deterministic. That is, two instances of the same data stored in the overflow area do not encrypt to the same cipher text.

Further, in some cases, the following scenario can occur: at first, there is no free entry in the content directory during a first writeback of a data line, thus the data line is stored in the overflow area; later, garbage collection occurs and one or more entries in the content directory are freed up, subsequently, a second writeback of a data line with the same data content occurs, and the data line is stored in the regular deduplicated content directory. These two instances of the same data do not encrypt to the same cipher text because these two instances still effectively use two IVs for encryption, where the IV associated with data in the content directory's hash bucket is fixed or null, and the IV of the entry in the overflow area is random but different from the IV associated with the hash bucket.

In some embodiments, the processor/memory controller can detect whether a read access is to the overflow area of the content directory or to a non-overflow area of the content directory by checking where the requested address resides. It can then apply the IV-based decryption. Similarly, the memory controller, which implements the content directory, is necessarily aware when a hash bucket for the content is full; thus, it can re-encrypt the data line using the IV corresponding to the overflow entry.

In some embodiments with multiple deduplication domains, the overflow areas between different deduplication domains use different keys. Thus, the same contents in different domains yield different encryption results.

In practice, the overflow area is a small percentage of the overall memory so the extra overhead for the IV metadata, being restricted to just overflow lines, is not significant, either in space or in time to access.

Deduplication reduces the amount of physical memory and power required for most applications, as demonstrated by investigations in the use of deduplicated memory. In some embodiments, deduplication also reduces the space overhead of secure metadata such as IVs because the secure metadata is only required for translation lines and overflow lines.

Hybrid Memory

In some embodiments, the storage includes a hybrid memory that is implemented using a combination of memories having different latencies. In the embodiments below, a hybrid main memory that includes non-volatile random access memory (NVRAM) and dynamic random access memory (DRAM) is discussed for purposes of example; other types of memories can be used in other embodiments. NVRAM has higher latency than DRAM, is lower in cost, and consumes less power. The resulting hybrid main memory system provides significantly larger capacity than feasible with DRAM alone, at a lower cost in capital expenditure and power consumption while providing reasonable access times by caching frequently accessed data in DRAM.

In some embodiments using hybrid main memory, the data lines are deterministically encrypted and deduplicated as described above, using the same memory line size and key in both the high latency memory and the low latency memory (e.g., NVRAM and DRAM). Therefore, data lines can be transferred between DRAM and NVRAM without encryption/decryption action on the data. For instance, a DMA engine can transfer the data lines without requiring access to the encryption keys. As with DRAM, using deduplication in the NVRAM saves on space otherwise consumed by duplicates as well as extra space that would otherwise be consumed by IV storage.

In some embodiments, the data lines in the low latency memory and high latency memory are managed in a manner similar to the data lines in the cache and the main memory. For example, the DRAM can be treated similarly as the cache and the NVRAM can be treated similarly as the main memory. Data lines are written to DRAM first then written back to the NVRAM as appropriate. A data line in DRAM can be flagged as modified, and neither deduplicated nor mapped into NVRAM. When the modified data line in DRAM is to be evicted, a process similar to process 500 is performed. In particular, the data content of the modified data line is looked up in the content directory in the NVRAM. An existing line is located if the data content is present in the content directory in the NVRAM; otherwise, a new data line is allocated in the appropriate bucket of the content directory. Further, translation lines that reference the modified data line are located, and references to the modified data line are revised to point to the existing line in the NVRAM.

In some embodiments, translation line eviction and data line eviction from a low latency memory in a hybrid memory system are handled similar to translation line eviction and data line eviction from the cache. Before a translation line is evicted from DRAM, each modified data line that is referenced by the translation line is deduplicated in NVRAM to determine a PLID in the NVRAM (referred to as the NVRAM PLID) for the data line contents, and the translation line is updated to refer to this new NVRAM PLID. Any data line with no referencing translation line is discarded when evicted. In such embodiments, NVRAM deduplication can be deferred as late as possible, and deduplication is avoided in some cases because the line is discarded before being evicted, thereby reducing deduplication overhead. In an embodiment where different keys are used for the NVRAM and the DRAM, on eviction to NVRAM, a modified line is first read and decrypted into the cache, re-encrypted with the NVRAM key, and then deduplicated into the NVRAM.

In some embodiments, on a first data access to a translation line resident in NVRAM, after returning the requested line, the memory controller prefetches and transfers the other data lines referenced by the associated translation line into DRAM, reducing the latency for subsequent references if they arise. This optimization is expected to provide some of the benefits of using a larger unit of transfer between the NVRAM and DRAM.

In some embodiments, the unit of encryption on the low latency memory is different from the unit of encryption on the high latency memory. As used herein, a unit of encryption refers to the amount of data that is encrypted to generate a single encryption result. For example, each memory line on DRAM is encrypted as a unit while multiple memory lines on the NVRAM are encrypted together as a unit (e.g., 64 lines are encrypted together). When data is transferred from the NVRAM to the DRAM, a unit comprising multiple memory lines from the NVRAM is decrypted, and the decrypted lines are transferred to the DRAM to be encrypted individually. In some embodiments, the encryption/decryption mechanisms are implemented on the processor chip. A data transfer unit (e.g., 64 lines) is transferred from NVRAM to the processor, which decrypts the data transfer unit and stores the memory lines in the cache. Subsequently, the memory lines are re-encrypted individually and written back to DRAM. In some implementations, the NVRAM is managed with deduplication and deterministic encryption even though the NVRAM employs a different data unit size than the DRAM. In some other implementations, only the DRAM portion implements deduplication and deterministic encryption, while the NVRAM uses conventional probabilistic encryption.

In embodiments where the NVRAM encrypts and transfers data in a larger unit than the DRAM, the NVRAM is effectively an I/O device in relation to the processor. That is, the processor does not actually read or write to this NVRAM directly. Instead, the DRAM and the NVRAM are used in a way that is similar to the cache and the main memory, respectively. Specifically, larger data blocks are read from the NVRAM into the DRAM and then made available to the processor. A similar mechanism is implemented for writeback. Effectively, the system is implementing a form of paging between DRAM and NVRAM.

Deduplication-based memory encryption has been described. The techniques described above are applicable to a main memory as well as to a secondary storage element. As used herein, a secondary storage element refers to a component such as a magnetic or optical disk, a solid state drive such as an NVRAM-based drive, etc. that is treated by the operation system and application software as a storage element rather than a memory. The operating system and application software typically read from and write to the secondary storage system using I/O function calls rather than memory access calls. In some embodiments of secondary storage systems, the translation lines and metadata are cached because the cost per access of separate data is generally significantly higher than with DRAM. For instance, the reference count on data lines could be stored in the DRAM, and recomputed on reboot by scanning the secondary storage (e.g., NVRAM) to count the number of references to each data line, thereby eliminating the need to store or update these values in the secondary storage.

Computer security using encryption and decryption of a deduplicated storage has been disclosed. The technique discussed above allows efficient low latency encryption and decryption to be performed, ensures high data security and scalability, reduces the amount of resources (e.g., physical memory, power, space overhead) required for most applications, and provides data security at no extra space cost.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A processor chip comprising:
one or more processor cores; and
a memory controller, wherein in response to a request from one or more of the one or more processor cores to write data content to a physical address in a main memory, the memory controller is to:
generate encrypted data content based at least in part on the data content;
attempt to obtain a reference to the encrypted data content in the main memory; and
in an event that the reference to the encrypted data content is not obtained:
store the encrypted data content at a new location in the main memory;
obtain a reference to the encrypted data content stored at the new location; and
modify a translation line to refer to the reference to the encrypted data content stored at the new location, wherein the translation line is stored in the main memory and is an indirect line that references a set of data lines.

2. The processor chip of claim 1, wherein in an event that the reference to the encrypted data content in the main memory is obtained, the memory controller is to modify the translation line to refer to the reference to the encrypted data content in the main memory.

3. The processor chip of claim 1, wherein the data content is associated with a particular domain of a plurality of domains and the memory controller is to generate the encrypted data content based at least in part on a particular encryption key associated with the particular domain.

4. The processor chip of claim 1, wherein the memory controller is a programmable logic device or an application specific integrated circuit (ASIC).

5. The processor chip of claim 1, further comprising a cache coupled with the one or more processor cores, and with the memory controller.

6. The processor chip of claim 5, wherein the cache is a hierarchical cache and the memory controller is coupled with a last level of the hierarchical cache.

7. The processor chip of claim 1, wherein the translation line is encrypted.

8. A memory controller comprising:
one or more communications interfaces; and
an encryption/decryption engine (EDE), wherein in response to a request from a processor, received via the one or more communication interfaces, to write data content to a physical address in a main memory, the EDE is to:
generate encrypted data content based at least in part on the data content;
attempt to obtain a reference to the encrypted data content in the main memory;
in an event that the reference to the encrypted data content in the main memory is obtained, modify a translation line to refer to the reference to the encrypted data content in the main memory, wherein the translation line is stored in the main memory and is an indirect line that references a set of data lines; and
in an event that the reference to the encrypted data content is not obtained:
store the encrypted data content at a new location in the main memory;
obtain a reference to the encrypted data content stored at the new location; and
modify the translation line to refer to the reference to the encrypted data content stored at the new location.

9. The memory controller of claim 8, wherein the data content is associated with a particular domain of a plurality of domains and the EDE is to generate the encrypted data content based at least in part on a particular encryption key associated with the particular domain.

10. The memory controller of claim 8, wherein the main memory is dynamic random access memory (DRAM).

11. The memory controller of claim 8, wherein the EDE performs a deterministic encryption function to generate the encrypted data content.

12. The memory controller of claim 8, wherein the translation line is encrypted, and the data content and the translation line are encrypted using different keys.

13. The memory controller of claim 8, wherein the memory controller and the processor are circuitry components on a processor chip.

14. A processor chip comprising:
one or more processor cores;
a cache coupled with the one or more processor cores; and
a memory controller coupled with the cache, wherein in response to a request from the one or more processor cores to access data content at a physical address in a main memory, the memory controller is to:
determine whether a translation line and a data line corresponding to the physical address are available in the cache, wherein the translation line is an indirect line that references a set of data lines, including the data line corresponding to the physical address; and
in an event that the data line is not available in the cache, to:
load the data line from the main memory;
decrypt the data line;
save the decrypted data line to the cache; and
present data from the decrypted data line to one or more of the one or more processor cores.

15. The processor chip of claim 14, wherein the cache is a hierarchical cache and the memory controller is coupled with a last level cache of the hierarchical cache.

16. The processor chip of claim 14, wherein the main memory is dynamic random access memory (DRAM).

17. The processor chip of claim 14, wherein in an event that the translation line and the data line are both not available in the cache, the memory controller is to:
load the translation line from the main memory;
decrypt the translation line;
save the decrypted translation line to the cache;
load the data line from the main memory;
decrypt the data line;
save the decrypted data line to the cache; and
present data from the decrypted data line to one or more of the one or more processor cores.

18. The processor chip of claim 14, wherein in an event that the translation line is not available in the cache and the data line is available in the cache, the memory controller is to:
load the translation line from the main memory;
save the translation line to the cache; and
present the data line from the cache to one or more of the one or more processor cores.

19. The processor chip of claim 14, wherein the memory controller is to generate a secure pad on a cache miss and use the secure pad to decrypt encrypted data fetched from the main memory.

20. The processor chip of claim 14, wherein the memory controller is to generate the secure pad concurrently with fetching an encrypted memory line from the main memory.

* * * * *